July 27, 1943.  H. C. THOMAS ET AL  2,325,438
THERMAL DEMAND WATTMETER
Filed June 18, 1941   3 Sheets-Sheet 1

Inventors:
Herbert C. Thomas,
Edward E. Lynch,
by Harry E. Dunham
Their Attorney.

July 27, 1943.  H. C. THOMAS ET AL  2,325,438
THERMAL DEMAND WATTMETER
Filed June 18, 1941   3 Sheets-Sheet 2
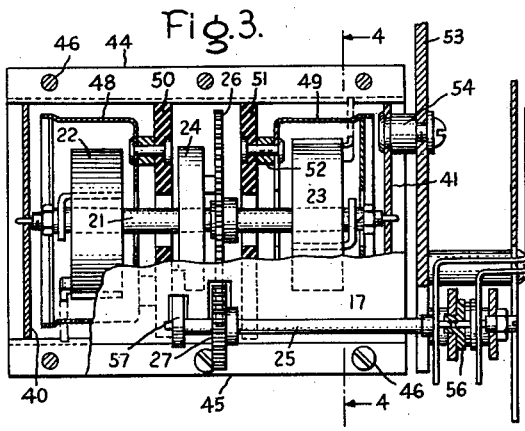
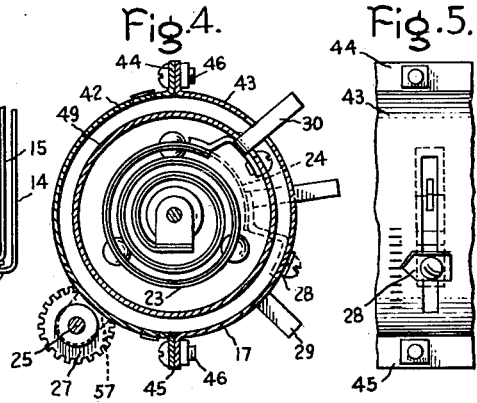
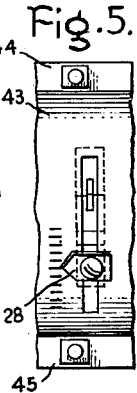
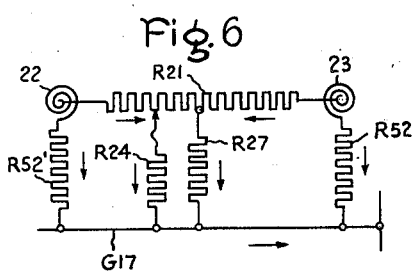
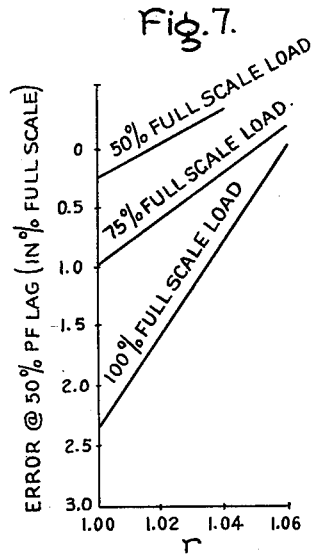
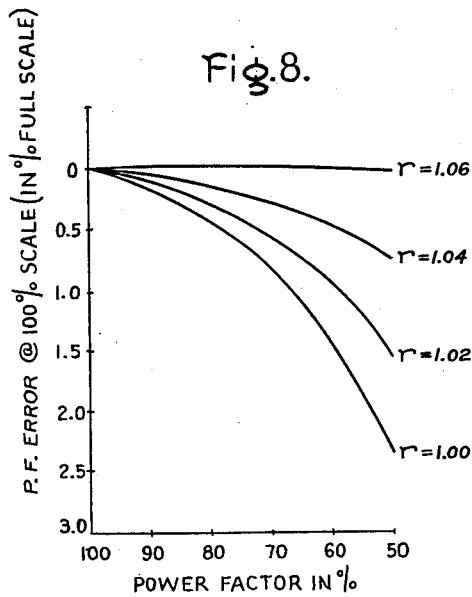
Inventors:
Herbert C. Thomas,
Edward E Lynch,
by Harry E. Dunham
Their Attorney.

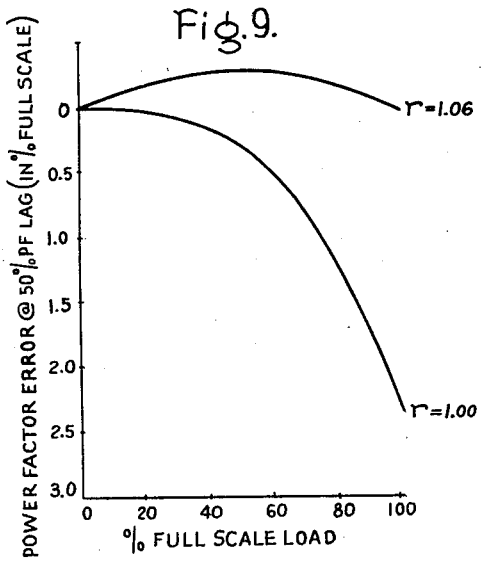
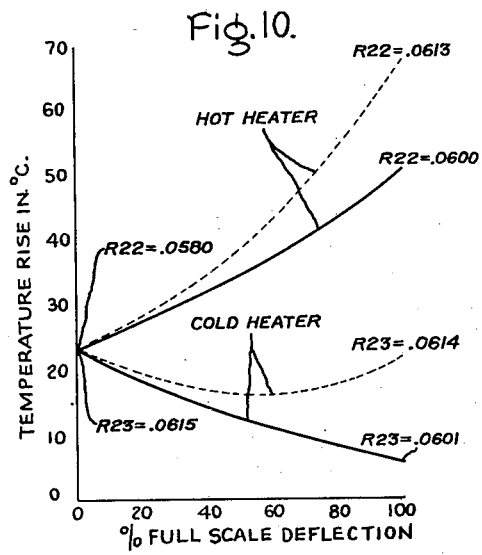
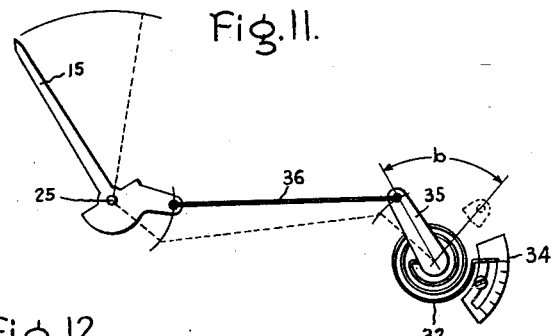
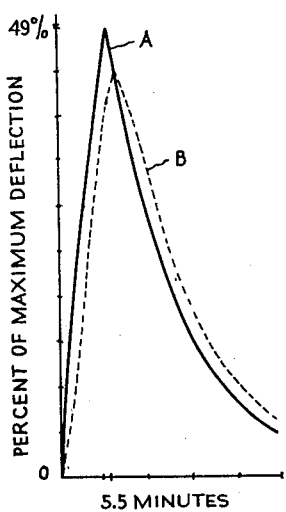

Patented July 27, 1943

2,325,438

UNITED STATES PATENT OFFICE 2,325,438

THERMAL DEMAND WATTMETER

Herbert C. Thomas, Montgomery, Ala., and Edward E. Lynch, Easthampton, Mass., assignors to General Electric Company, a corporation of New York Application June 18, 1941, Serial No. 398,602

8 Claims. (Cl. 171—95)

Our invention relates to thermal wattmeters of the type in which there is an appreciable time lag of response and an averaging effect such that the measurement may be considered to represent the load demand over an appreciable time interval. Our invention concerns various improvements in such meters for the purpose of obtaining high accuracy under the various measurement conditions likely to be encountered in practice.

The features of our invention which are believed to be novel and patentable will be pointed out in the claims appended hereto. For a better understanding of our invention reference is made in the following description to the accompanying drawings in which Fig. 1 is a perspective front view of a meter embodying our invention equipped with a maximum demand pointer, Fig. 2 is a perspective view showing the moving parts of our meter and their relation one to another and the electrical connections, Fig. 3 is a partially sectioned view of the thermal responsive measuring elements and supporting enclosure, Fig. 4 is a view in section along the line 4—4 of the structure of Fig. 3, Fig. 5 is a partial side view of the casing shown in Fig. 3 showing a zero adjusting feature, Fig. 6 is an explanatory diagram which will be referred to in explaining heat flow paths in our meter, Figs. 7, 8, 9 and 10 are curves pertaining to a power factor compensating feature that will be referred to in explaining how errors ordinarily due to power factor variation have been eliminated, Fig. 11 is an explanatory view of an ambient temperature compensating feature, and Fig. 12 shows a comparison of time-deflection characteristics obtained with different types of heater elements.

Figure 1:
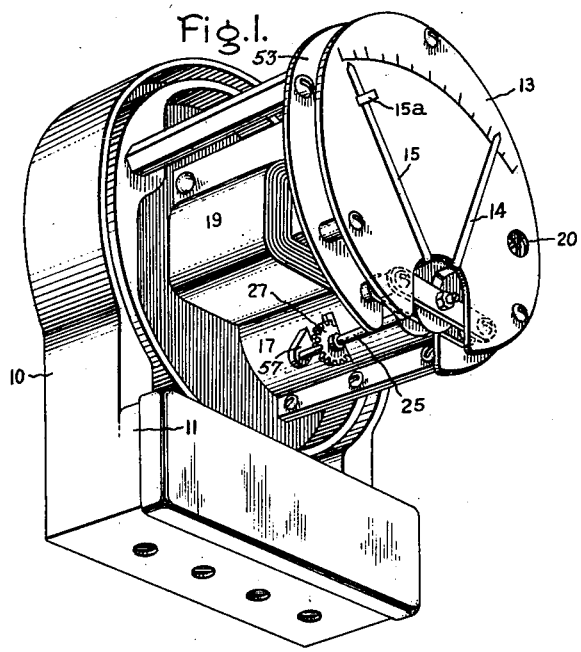

In Fig. 1 we have shown a perspective front view of a commercial form of meter embodying our invention. The purpose of such meter is to obtain a measurement of the watt demand of an alternating current power circuit over an appreciable time interval without the necessity of employing an expensive integrating type watthour meter and clock controlled demand meter combination. It will be noted that the meter is to be housed in a casing having a base 10 and a terminal chamber 11. A glass cover, not shown but generally similar to those used with house type watthour demand meters, will be used. 13 represents a kilowatt dial, 14 a maximum demand friction pointer and 15 an indicating pointer which is moved over the scale in accordance with the watt measurement.

The friction pointer is moved upscale by the projection 15a of the indicating pointer 15 and remains in the highest position reached until reset. The indicating pointer is connected to be moved by thermal responsive watt-measuring apparatus contained within the cylindrical housing 17. The casing also houses current and potential transformers, one of which is shown at 19, which are electrically connected between the terminal chamber 11 and electric heater elements in housing 17 as will be explained. The meter is compensated for ambient temperature changes and such compensation is partially accomplished by a bimetal spiral and full scale adjusting device which is located behind the central right portion of the dial. An opening 20 in the dial plate allows a screw driver to be inserted when this device is to be adjusted.

Figure 2:
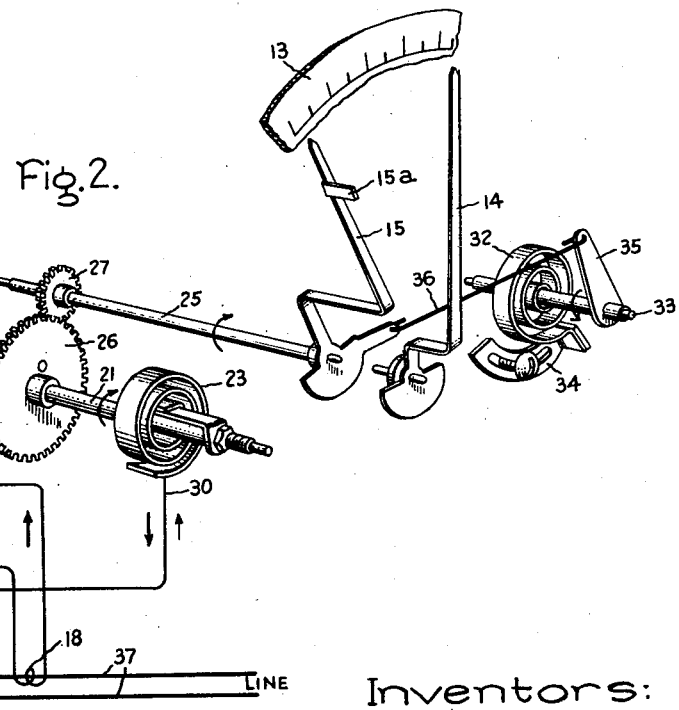

An exploded diagrammatic view of the pointer moving system is shown in Fig. 2. This comprises a metal shaft 21 of good heat conductivity which does not change appreciably with temperature and which is of low electrical resistance, which resistance does not change appreciably with temperature. This shaft is pivoted at its two ends and to which is secured the inner ends of spirals 22, 23 and 24. Spirals 22 and 23 are thermal motors comprising thermal responsive bimetal spirals through which current is conducted and which therefore serve as their own resistance heaters. They have their outer ends fixed as shown for spiral 23 in Fig. 4. Spiral 22, when heated, tends to turn shaft 21 counterclockwise and the pointer shaft 25, which is geared thereto through gears 26 and 27 in a clockwise or upscale direction. Spiral 23, when heated, tends to turn shaft 21 in a clockwise direction and hence opposes the torque produced by spiral 22. The major portion of the ambient temperature compensation is obtained by reason of the reverse torque of spirals 22 and 23. The spiral 24 although used as a current terminal for heater currents conducted through spirals 22 and 23, is not of bimetal and does not produce torque on shaft 21 in response to changes in temperature. Its outer end is fastened to an exposed clip 28 which is normally held stationary on the shell 17 by a clamping screw. This clip 28 may be adjusted to adjust the spiral spring 24 and the zero setting of pointer 15.

The ambient temperature compensating bimetal spiral and full scale adjusting spring is shown at 32. Its outer end is secured to a support 34 which may be adjusted about the axis of shaft 33 to which the inner end of the spiral is secured. Shaft 33 has a crank arm 35 secured thereto and this crank is connected to the pointer shaft 25 through a fine wire link member 36 secured in an eye in the hub of the pointer 15. Spiral 22, when it increases in temperature, produces a counterclockwise rotation of shaft 33. The wire 36 is secured at such a point about the axis of rotation of pointer 15 that the spiral 32 has substantially no turning influence on shaft 25 when the pointer 15 is in its zero indicating position since under this condition the wire 36 is substantially in line with shaft 25. The spiral 32 tends to oppose the upscale deflection of pointer 15 by an amount which increases with the deflection of pointer 15 above zero and which decreases with rise in ambient temperature. The actions are such as to correct for residual ambient temperature errors for all scale deflections of the pointer 15.

It is seen that the pointer 15 has an off-set part 15a projecting forward of the friction pointer 14 which serves as a dog to contact and move friction pointer 14 upscale to the maximum deflection of pointer 15. The pointers will indicate at the same point on the scale when thus engaged.

The electrical connections are also shown in Fig. 2 for a single phase load line 37. 19 is a potential transformer connected across the line and 18 a current transformer connected in the line. These transformers are housed in the meter casing 10 and the connections are made through the terminal chamber 11, Fig. 1. A current substantially proportional to the voltage flows through spiral 23, shaft 21 and spiral 22 and is represented by the light arrow on the connecting leads. A current proportional to line current flows through spiral 24 to the shaft 21 and divides and returns through 22 and 23 in parallel to the midtap of the secondary of transformer 19 and back to the current transformer and is represented by the heavy arrow on the connecting leads. When the alternating current reverses, all of the arrows change direction. It is seen that spiral 23 is heated by a current substantially proportional to the vector difference of the current and voltage of the power circuit and spiral 22 is heated by a current substantially proportional to the vector sum of the current and voltage of the power circuit. As is known, the heating is proportional to the square of the current flowing in a heater element.

Thus, heating in spiral 23 is substantially proportional to $(I-V)^2$ and in spiral 22 to $(I+V)^2$, where I and V represent the components of current and voltage of the power circuit taken vectorially and when the resistances of the two spirals 22 and 23 are assumed to be equal. Since the turning effort of the two spirals are opposed, the resultant deflection on shaft 22 is represented by $$D=(I+V)^2-(I-V)^2=4IV$$

Theoretically, the ratio of heater voltage current to heater load current may be anything desired but practically this ratio should be of the order of 2 at full scale for the meter design described. Since I and V are taken as vectors, the deflection D is proportional to watts and is theoretically independent of power factor. Actually, however, such devices have a power factor error and one of the features of our invention is to make the resistances of spiral 22 slightly less than that of spiral 23 to compensate for power factor errors, as will be explained more fully when the reason for such error is made apparent.

The structural assembly of the heater spirals and related parts is represented in Figs. 3 and 4, Fig. 3 being a part sectional side view of the assembly and Fig. 4 an end view on line 4—4, Fig. 3. The assembly is enclosed in a metal housing 17 having end walls 40 and 41 and a cylindrical shell split into two halves 42 and 43 with parallel flanges 44 and 45 for removably securing the halves together as by screws 46. For thermal purposes the cylindrical housing 17 is polished on the inside. The shaft 21 is pivoted at the centers of the end wall sections 40 and 41. The bimetal spirals 22 and 23 are contained within cylindrical metal housings 48 and 49 having central end openings to allow passage of shaft 21 without contact. The housings 48 and 49 are of metal having polished inner and outer surfaces. The outer ends of the spirals 22 and 23 are securely fastened to the inner surfaces of cylinders 48 and 49 with good thermal conducting connections, as shown for spiral 23, Fig. 4. The cylinders are held in place by being supported from plates 50 and 51 of insulating material, the peripheries of which are held by the outer shell 17. Two or three spaced fastening lugs, one being shown at 52, are used for each cylinder. The design and material for the lugs 52 and plates 50 and 51 are such as to produce low heat conduction. The plates 50 and 51 have center openings to allow passage of shaft 21 without contact. The leads 29 and 30 to the spirals 22 and 23 are a part of the lugs which fasten the spirals to the cylinders 48 and 49. These leads pass out through openings in housing 17. The cylindrical housing 17 is fastened to a meter supporting plate 53 by spacer posts shown at 54 which engage end plate 41. Plate 53 also supports a pivot bearing 56 for the forward end of the pointer shaft 25. The rear end of shaft 25 is supported in a bearing plate 57 extending through shell 17 from support 50.

The structure shown in Fig. 3 is designed to have thermal characteristics important to a practicable and accurate device as follows. Low heat loss by convection and radiation from the heater spirals as compared to the heat loss by conduction, a balanced heat loss by conduction from both heater spirals, a minimum of variation in heat conducting paths for different degrees of expansion of the spirals and hence changes in the position of the heater spirals, a minimum of thermal lag of the type which is due to the slow diffusion of heat through insulation but with a thermal lag due to heat storage, high efficiency or high available torque for a given deflection for the amount of electric energy consumed, compensation for errors that would otherwise be due to variations in power factor and minimizing errors due to changes in ambient temperature.

It is desirable to make the heat loss by radiation and convection from each spiral low because these methods of heat dissipation introduce errors in the operation of the meter due to the fact that they are non-linear with respect to temperature variations. Such types of heat loss are largely eliminated by the construction shown in Fig. 3. The heater spirals are enclosed by the metal cylinders 48 and 49 and to which the spirals are solidly connected by a joint of good thermal conductivity. Because of this, heat generated in the spiral flows readily to the cylindrical cup by conduction and the temperature difference between the cylinder and spiral is too small for any appreciable heat transfer by convection or radiation. Also, the spacing between the cylinders 48 and 49 and the spirals is such as to further minimize the percentage of heat transfer by convection. In the design shown, this spacing should be in the neighborhood of one-eighth of an inch. Further, the cylinders 48 and 49 have inner polished surfaces which are protected so as to maintain their polish and this tends to further minimize heat transfer by radiation. We have found aluminum to be satisfactory for the material used in forming the cylinders.

Heat transfer from the cylinders 48 and 49 to the surrounding shell 17 by radiation and convection is minimized also by reason of a corresponding spacing between them and by reason of protected adjacent polished metal surfaces on both. The shell 17 may be of aluminum.

There is heat transfer from the spirals 22 and 23 by conduction to shaft 21 because of the good thermal conducting connection between their inner ends and the shaft. Such heat transfer is mainly towards center spiral 24 from both end spirals and through spiral 24 to the outer shell 17. Heat loss by conduction is proportional to the first power of the temperature difference along the path of transfer and does not cause temperature errors if properly balanced so that the heat loss from the two end spirals is equal for equal heat inputs. Such balance can easily be obtained by properly positioning the connection of central spiral 24 along the shaft 21. We may use an electrical circuit analogy to picture the conduction heat loss relation of the structure as shown in Fig. 6. In Fig. 6 let R21 represent the resistance to heat flow by conduction along shaft 21 from spirals 22 and 23. Let R52 represent the equivalent resistance to heat flow from spiral 22 through all other paths to the shell or frame 17 designated in Fig. 6 as a ground wire G17. Owing to the construction, this resistance is high. Similarly, R52' represents the high resistance to heat flow from spiral 23 to the frame 17 by all paths except through the shaft. R24 then represents the resistance to heat flow by conduction out through spiral 24. The arrows adjacent the resistances represent the directions of heat flow. R27 may be added to represent the high resistance to heat flow by conduction through gears 27 and 26. It is now evident that by adjusting the position of resistance R24 along resistance R21 the resistance from spirals 22 and 23 to ground may be made equal. This is the theory of design of our thermal wattmeter for obtaining similar heat loss characteristics from the heater spirals, and when this condition is obtained, taking into consideration all factors, the thermal heating and cooling characteristics of the two spirals will be similar and balanced, which is one of the conditions required for accurate measurements. We have found that spiral 24 should be approximately midway between spirals 22 and 23 but that the exact position may vary slightly in different devices and is generally slightly to the left of a mid-position, about as shown in Figs. 2 and 3.

Referring again to Figs. 2 and 3, it will be noted that the heating is applied directly to the resistance spirals 22 and 23 and is not required to flow through insulation resistance, as would be the case where the commonly used separate heater resistances are employed. Hence, the efficiency is high and the thermal lag is due primarily to heat storage in the spirals themselves. It is possible to obtain greater torque per watt loss by this arrangement as compared to an arrangement where separate heaters are used for heating the spirals.

The reason why it is desirable to avoid lag due to diffusion of heat through insulation and the like may be explained by reference to the curves of Fig. 12 which show deflection time curves for two types of thermal wattmeters of the same rating designed to produce 90% of full scale deflection in 19 minutes. The full line, curve A, represents the response for our meter and the dotted line, curve B, represents the response for a commercial thermal wattmeter in which separate heaters were used to heat the spirals through insulation. At the start of the test, both meters were at the same room temperature of 25.5° C. The same unity power factor watt load was applied to both and held constant for 5.5 minutes and then cut off. Our meter curve A reached 49% of full scale deflection in 5.5 minutes and then started to return to zero. The other meter curve B reached 43% of full scale deflection in 5.5 minutes and and 45% of full scale deflection in 5.6 minutes and then started to return to zero. It is seen that the lag of meter B caused its deflection to be low over the heating period, high over the cooling period and its maximum deflection to be low, and to occur after the load had been removed. From this it can be seen that a meter having its spirals used as its heaters will give more consistant results than one having insulation lagging between heaters and spirals when both are operated under varying load conditions. Also, the meter having characteristics of curve A can have its time lag more readily controlled than the meter of curve B because with the A meter this depends primarily on the thermal storage of the spirals, whereas in the B meter it depends also on thermal storage of the separate heaters and the amount and character of insulation used.

In theory the resistances of the two spirals 22 and 23 should be equal and remain equal at all operating temperatures. However, all suitable temperature responsive bimetal material has a temperature coefficient of resistance and hence it is not possible to have the resistances remain equal. The result is that the meter has an error largely a power factor error unless compensated for. We deliberately make the resistance of spiral 23 greater than that of spiral 22 at room temperature to produce such compensation.

The extent to which the resistances of spirals 22 and 23 are made unequal will be clearer from a consideration of Figs. 7, 8, 9, and 10. All of these curves are plotted on the basis of employing bimetal spiral resistances having a positive temperature coefficient of resistance of .00133 at 20° C. and measuring the ratio $r$ at 25° C., where $$r = \frac{\text{Resistance of spiral 23}}{\text{Resistance of spiral 22}}$$

Also the ratio of voltage component of heater current to the load component of heater current for 100% scale deflection or load at unity power factor is taken as 2.

In Fig. 7 the error at 50% lagging power factor in percent of full scale is plotted against different ratios $r$ for ½, ¾ and full load. The upper curve shows that to obtain perfect compensation at ½ load the ratio $r$ should be 1.02. At ¾ load, middle curve, $r$ should be 1.052 and for full load lower curve $r$ should be 1.06. Fig. 8 shows the power factor error at different power factors for four different values of $r$ with full load on the meter. Substantially perfect compensation at all power factors is obtained where $r=1.06$. If $r=1$, there is an error of $-2.35\%$ at $50\%$ power factor, $-1.4\%$ at $60\%$ power factor, etc. The curves $r=1.04$ and $r=1.02$ show the errors at various power factors with the corresponding values of $r$. These curves indicate that when perfect compensation is obtained for one load and power factor it is substantially correct for the same load at all power factors. Fig. 9 shows the variation of the error at $50\%$ power factor with load and indicates that with correct compensation at one load, curve $r=1.06$, the compensation is nearly correct for all other loads at that power factor. Thus, where $r=1.06$ the maximum error occurs at ½ load and is only about ¼ of $1\%$ and is positive.

In Fig. 10 the temperature rise of each heater spiral as a function of load for $50\%$ (dotted line) and $100\%$ (full line) power factors is shown. The two upper curves are for the hot spiral 22 and the two lower curves are for the cold spiral 23. These curves are for a compensated meter where $r=1.06$ at $25°$ C. The curves for the cooler spiral show one of the peculiarities of this meter in that the temperature rise actually goes down as the load goes up. This is because at zero load only voltage current flows in the spirals and as the watt load and the current component goes up the difference in the voltage and current component currents in the low temperature spiral causes a resultant decrease in total current and heating therein. On these curves the values of the resistances used at the different temperatures are marked at the extremities of the curves where R22 is the resistance of spiral 22 and R23 is the resistance of spiral 23. These curves indicate that for the value of $r$ which gives correct compensation at one load, the resistances of both heaters at that load becomes essentially equal and remain equal for all power factors. Thus, the meter is compensated at full load using $r=1.06$ and at full load R23 and R22 are substantially equal both at unity power factor and at $50\%$ power factor, although they have a temperature difference of about $45°$ C.

It will be evident from the curves, Figs. 7–10, how power factor compensation is obtained. The ratio $r=1.06$ mentioned which appears to be the most satisfactory for the meter described may not be the correct ratio to be used for a meter of different design, although the same general principles will apply. If, for example, we use bimetal having a higher temperature coefficient of resistance, we will need to use a correspondingly higher ratio $r$. Also, if we so design the meter that the temperature difference between the hot and cold spirals is different than $45°$ at full load, it will make a difference in the value of $r$ to be used. Likewise, a substantially different ratio of voltage and current components at full load will probably change the conditions. These and other factors will need to have consideration in selecting the ratio $r$ for power factor compensation and we do not wish to limit our invention to any particular ratio $r$. Moreover, we believe we are the first to discover that power factor compensation may be obtained by selecting a ratio $r$ other than unity in accordance with the principles outlined herein. To review this compensation briefly it may be stated that the two spirals have a temperature coefficient of resistance and do not operate at the same temperature under load and for a given load the temperatures of the spirals increase with decrease in power factor. As a result of these and other factors the meter has a power factor error causing the meter to read low with low power factors unless the error is compensated for. We have discovered that it is possible to select such a relation between the resistances of the two spirals and their temperature coefficients of resistance and the operating temperatures that the two spirals have essentially the same resistance under a selected load and preferably full load and remain approximately equal with changes in power factor at such load and that such arrangement substantially compensates the meter for changes in power factor errors at all loads. In general this is done by making the resistance of spiral 23 slightly higher than that of spiral 22 at a given temperature.

The required difference in resistance of R22 and R23 is preferably obtained by making spirals 22 and 23 out of the same lengthwise strip of bimetal and making spiral 23 longer than spiral 22. In this way one can then be reasonably certain that the temperature coefficient of resistance, the torque per degree temperature rise and other bimetal properties will be and remain the same.

The bimetal which we have used experimentally is purchased under the trade name of Truflex B in which the high expansion side is composed of $22\%$ nickel, $3\%$ chromium and $75\%$ iron and the low expansion side of $36\%$ nickel and $64\%$ iron. The cross-section used was $.024 \times .406$ inch. The length of spiral 22 was 17 and ⅝ inches and that of spiral 23, 18 and ⅝ inches. These spirals have about six turns with an outside diameter of 1¼ inches. These design factors may be modified to suit requirements, but we desire to use stiff driving spirals primarily for three reasons: first to reduce deflections of the pointer due to vibration, second to obtain a liberal spacing between turns for the required amount of bimetal material in a small space, and third to keep the displacement of the spirals small. Meters having spirals of the stiffness indicated will have no resonant frequency vibration characteristic which causes appreciable pointer vibration. In the spirals mentioned the approximate minimum spacing between convolutions is of the order of .025 inch. The torque deflection and the time interval of the meter is determined primarily by the volume of a given bimetal used in the spirals. Variations in the distance of the outer convolution of the spiral and the shell will cause an undesirable variation in heat transfer and this variation is kept within such limits by the construction described that the escape of heat from the spirals is substantially proportional to temperature rise. In other words, the heat transfer coefficient does not vary appreciably with the displacement of the spiral.

With the type of driving spirals used the full scale deflection of the shaft 21 is of the order of 23 degrees for practicable temperature limits and ample torque. Hence it is desirable to amplify this deflection by the gears 26 and 27 which may produce a 3-to-1 amplification.

The greater part of the necessary ambient temperature compensation of the meter is obtained by reason of the fact that the driving spirals have reversed torques. However, there remains a residual ambient temperature error that is substantially proportional to load because of the temperature difference variation between the two driving spirals with different loads. This residual error is substantially eliminated by the mechanism shown in Figs. 2 and 11, which in addition is used for full scale adjustment and is arranged to eliminate back lash in gears 26 and 27 at all positions of the pointer.

In Fig. 11 the bimetal spiral 32 acting as a spring produces a restraining force upon the up-scale deflection of pointer 15, the amount of which for any given deflection may be adjusted by adjustment of the outer end of the spiral at 34. This restraining torque is of such magnitude as to give the desired full scale adjustment and in the illustration corresponds to a tensioning of the spring 32 and a turning of shaft 33 through an angle $b$ of about 135 degrees when the ambient temperature is 25° C. It will be noted that the pointer is on zero and that the link 36 exerts a very small but definite down scale torque on the pointer shaft. This is made sufficient that with zero load on the meter and a proper adjustment of the zero of pointer 15 any back lash in gears 26, 27 is taken up.

The restraining torque produced by spring 32 increases with upscale deflection of pointer 15 because of the arrangement shown. This restraining torque depends upon the radius of arm 35, its angular position, the length of link 36, the radius arm of its connection to the pointer structure, and the angle of such radius arm with respect to link 36. Also, this restraining torque decreases with rise in ambient temperature. Therefore, this device provides full scale adjustment, compensates for the residual ambient temperature error and takes up back lash. With the highest ambient temperature contemplated there should be some restraining torque produced by spiral 32 at zero load if perfect temperature compensation is desired.

An upscale position of the parts is indicated in dotted lines, Fig. 11. It will be evident that certain of the structural features of our thermal meter are applicable to thermal meters generally and not confined to wattmeters.

What we claim as new and desire to secure by Letters Patent of the United States is:

1. A thermal wattmeter comprising a movable watt indicator, a scale on which said indicator indicates, a first thermal means for moving said indicator in an up-scale direction, a second thermal means for opposing such movement, said thermal means including resistance heaters having a positive temperature coefficient of resistance, the resistance of the heater of the first thermal means being slightly less than that of said second thermal means at a given temperature, connections for conveying heater current through the smaller resistance heater proportional to the vector sum of the current and voltage of the circuit to be metered and connections for conveying heater current through the larger resistance heater proportional to the vector difference of the current and voltage of the circuit to be metered.

2. A thermal wattmeter comprising first and second resistance heaters having a positive temperature coefficient of resistance, connections for conveying current through the first heater proportional to the vector sum of the current and voltage of the circuit to be metered, connections for conveying current through the second heater proportional to the vector difference of the current and voltage of the circuit to be metered, and a movable watt measurement means operated in response to the differential heating of said heater, said second heater having a resistance sufficiently greater than the first heater under no load temperature conditions to make the resistances substantially equal under full load temperature conditions.

3. A thermal wattmeter comprising first and second bimetal thermal responsive resistance spirals having a positive temperature coefficient of resistance, movable watt measuring means operated in response to the differential heating of said spirals, connections for conveying current proportional to the vector sum of the current and voltage to be measured through the first spiral, connections for conveying current proportional to the vector difference of the current and voltage to be measured through the second spiral, said spirals being similar except as to length and their length differing by an amount to make their resistances approximately equal at their different full load operating temperatures.

4. A thermal wattmeter comprising a pair of bimetallic thermal responsive resistance spirals having a positive temperature coefficient of resistance, a watt measurement indicator operated in response to the differential heating of said spirals, connections for conveying heating currents through said spirals proportional respectively to the vector sum and the vector difference of the current and voltage of the circuit to be metered, said spirals differing in resistance at a given temperature by an amount sufficient to make their resistances substantially equal at approximately the full load operating temperatures of the respective spirals.

5. A thermal wattmeter comprising a pair of thermal motor means each including a heater having similar positive temperature coefficients of resistance, a movable indicator operated in response to the differential action of said pair of thermal motor means, connections for conveying heating currents through said heaters proportional respectively to the vector sum and the vector difference of the current and voltage of a circuit to be metered, said pair of thermal motor means having balanced thermal loss characteristics and having the heater which operates at the lower temperature of sufficiently higher resistance than the other heater that the heaters are of substantially equal resistance at their different full load operating temperatures.

6. A thermal demand meter comprising a metal shaft of good thermal conductivity, a pair of bimetallic thermal responsive conductor spirals spaced apart along and having their inner ends secured to said shaft, a pair of cylindrical metal housings enclosing said spirals and securing the outer ends thereof, a spiral spring having its inner end secured to said shaft between said thermal responsive spirals, means for adjustably securing the outer end of said spring so that it may be rotated about the axis of said shaft, connections including said spring and shaft for conveying heating currents through said thermal responsive conductor spirals, a cylindrical metal shell enclosing said pair of cylindrical housings and having end walls rotatably supporting said shaft, said housings having polished inner and outer surfaces and said shell having a polished inner surface to minimize heat loss by radiation from said bimetal spirals, the spacing between the bimetallic spirals and their housings being of the order of ⅛ of an inch to minimize heat loss by convection, means for supporting said cylindrical housings in said shell said means being of a design to minimize heat loss by conduction, said spiral spring being so positioned between the bimetal spirals that, acting as a heat conductor, it balances the heat loss from both spirals when they are equally heated.

7. A thermal demand meter having actuating means comprising a rotatively mounted metal shaft of good thermal conductivity and a pair of thermal responsive bimetal spirals spaced apart along said shaft which, when heated, produce reverse torques on said shaft, the inner ends of said spirals being secured to said shaft and the outer ends of said spirals being fixed, a housing structure designed to minimize heat loss by convection and radiation from said spirals, a spring having its inner end secured to said shaft between said spirals and its outer end adjustably secured to said housing structure for adjusting the rotary position of said shaft, said spring serving with said shaft as a thermal conductor and so positioned along said shaft as to balance the heat loss from said spirals when they are equally heated, and electrical connections including said spring and shaft for conveying heating currents through said spirals.

8. In a thermal meter, a rotatively mounted shaft, a pair of bimetal thermal responsive spirals spaced apart along and having their inner ends secured to said shaft for producing differential rotative torques on said shaft when said spirals are heated, supporting and housing structure for said spirals and shaft, and a spring having one end secured to said shaft between said spirals and the other end adjustably secured to said housing structure for adjusting the rotary position of said shaft, said spirals serving as their own heater resistors and said shaft and spring serving as electrical connections for said spirals and being so relatively positioned as to serve as heat conductors for balancing the heat loss from both spirals when they are equally heated.

HERBERT C. THOMAS.
EDWARD E. LYNCH.